(12) United States Patent
Frese et al.

(10) Patent No.: US 10,124,283 B2
(45) Date of Patent: Nov. 13, 2018

(54) ROTATIONAL AID FOR SELF-CLEANING FILTER

(71) Applicant: General Electric Company, Schenectady, NY (US)

(72) Inventors: Christopher Conrad Frese, Greenville, SC (US); Bradly Kippel, Greenville, SC (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 15/358,431

(22) Filed: Nov. 22, 2016

(65) Prior Publication Data

US 2018/0140988 A1    May 24, 2018

(51) Int. Cl.
*B01D 46/00* (2006.01)

(52) U.S. Cl.
CPC ..... *B01D 46/0073* (2013.01); *B01D 46/0065* (2013.01); *B01D 46/0068* (2013.01); *B01D 46/0079* (2013.01); *B01D 2271/02* (2013.01); *B01D 2273/14* (2013.01); *B01D 2279/60* (2013.01)

(58) Field of Classification Search
CPC ............ B01D 46/00; B01D 46/0056; B01D 46/0065; B01D 46/0068; B01D 46/0073; B01D 46/0079; B01D 2271/02; B01D 2279/60; B01D 2273/14

USPC ............ 55/282–305, 341.1–341.7, 361–382; 95/279

See application file for complete search history.

(56) References Cited

U.S. PATENT DOCUMENTS

| 4,661,129 | A   | * | 4/1987 | Nederman | ......... B01D 46/0075 55/283 |
| 6,309,447 | B1  |   | 10/2001 | Felix | |
| 8,048,307 | B2  |   | 11/2011 | Lee | |
| 8,308,953 | B2  |   | 11/2012 | Lee | |
| 8,404,030 | B2  |   | 2/2013 | Schumacher | |
| 8,673,040 | B2  |   | 3/2014 | Handley et al. | |
| 2004/0003578 | A1 | * | 1/2004 | Twiefel | ............ A01D 41/1252 55/289 |
| 2008/0115668 | A1 | * | 5/2008 | Haavisto | ............ B01D 46/0058 95/280 |
| 2010/0083987 | A1 | * | 4/2010 | Reining | ............. B01D 46/0068 134/22.12 |

* cited by examiner

*Primary Examiner* — T. Bennett McKenzie
(74) *Attorney, Agent, or Firm* — James W. Pemrick; Ernest G. Cusick; Frank A. Landgraff

(57) ABSTRACT

A filter assembly for a gas turbine system includes a filter element configured to remove entrained particles from air which passes through the filter element in a first direction toward a central air passageway. A motion generator arranged to rotate the filter element about a longitudinal axis extending in an airflow direction of the air passageway to cause particles accumulated on the filter element to fall downwardly away from the filter element due to gravity.

16 Claims, 6 Drawing Sheets

Single Row Filter Pulse

Post Pulse

ROTATIONAL AID FOR SELF-CLEANING FILTER

TECHNICAL FIELD

This invention relates generally to gas turbines, and more particularly to filter systems for filtering air upstream of a compressor.

BACKGROUND

In a gas turbine, a filter house system may be arranged upstream of the compressor in order to remove particles (e.g., dust) from air which enters the compressor. As particles are removed from the air, the particles accumulate on the surface of a filter. Over time, filters may become clogged which increases a system pressure drop thereby leading to decreases in gas turbine efficiency. A pulse operation may be used to provide a blast of compressed air to create a shockwave inside of the filter cartridge to blow/shake accumulated dust off of the filters, as illustrated in FIG. 6. Once the dust reaches the bottom of the filter house system, it can be removed. However, referring to FIG. 7, dislodged dust 300 radiates outwardly and is subject to gravity and airflow forces. Some dust may fall or be pulled back onto the same filter it was just dislodged from and some dust may fall onto upper and/or lower filters.

BRIEF SUMMARY

One exemplary but nonlimiting aspect of the disclosed technology relates to a gas turbine air filtering system including a filter element that is rotated about a longitudinal axis to allow gravity to pull dust off of the filter element.

One exemplary but nonlimiting aspect of the disclosed technology relates to a filter assembly for a gas turbine system comprising a filter element having a porous structure configured to pass air therethrough, the filter element being arranged so as to define a hollow interior forming an air passageway, the filter element being configured to remove entrained particles from air which passes through the filter element in a first direction toward the air passageway; and a motion generator arranged to rotate the filter element about a longitudinal axis extending in an airflow direction of the air passageway to cause particles accumulated on the filter element to fall downwardly away from the filter element due to gravity.

Another aspect of the disclosed technology relates to a method of cleaning a filter element in a gas turbine system comprising 1) providing a filter element having a porous structure configured to pass air therethrough, the filter element being arranged so as to define a hollow interior forming an air passageway, the filter element being configured to remove entrained particles from air which passes through the filter element in a first direction toward the air passageway; and 2) rotating the filter element about a longitudinal axis extending in an airflow direction of the air passageway to cause particles accumulated on the filter element to fall downwardly away from the filter element due to gravity.

Other aspects, features, and advantages of this technology will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various examples of this technology. In such drawings.

DETAILED DESCRIPTION OF THE ILLUSTRATED EMBODIMENTS

Figure 1:
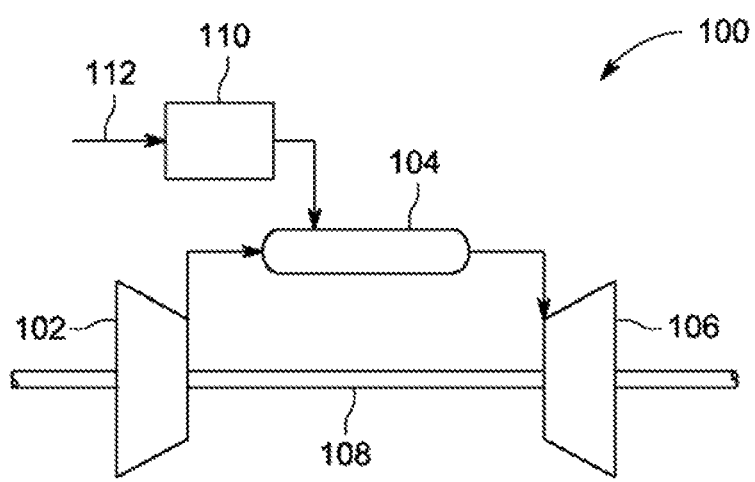
FIG. 1 is a schematic representation of a gas turbine engine, including a combustor, fuel nozzle, compressor and turbine according to an example of the disclosed technology.

FIG. 1 is a schematic diagram of an exemplary turbomachine, e.g., a gas turbine system 100. The system 100 includes a compressor 102, a combustor 104, a turbine 106, a shaft 108 and a fuel nozzle 110. In another example, the system 100 may include a plurality of compressors 102, combustors 104, turbines 106, shafts 108 and fuel nozzles 110. The compressor 102 and turbine 106 are coupled by the shaft 108. The shaft 108 may be a single shaft or a plurality of shaft segments coupled together to form shaft 108.

The combustor 104 may use liquid and/or gas fuel, such as natural gas or a hydrogen rich synthetic gas, to run the engine. For example, fuel nozzles 110 are in fluid communication with an air supply and a fuel supply 112. The fuel nozzles 110 create an air-fuel mixture, and discharge the air-fuel mixture into the combustor 104, thereby causing a combustion that heats a pressurized gas. The combustor 104 directs the hot pressurized exhaust gas through a transition piece into a turbine nozzle (or "stage one nozzle") and then a turbine bucket, causing turbine 106 to rotate. The rotation of turbine 106 causes the shaft 108 to rotate, thereby compressing the air as it flows into the compressor 102.

Figure 2:
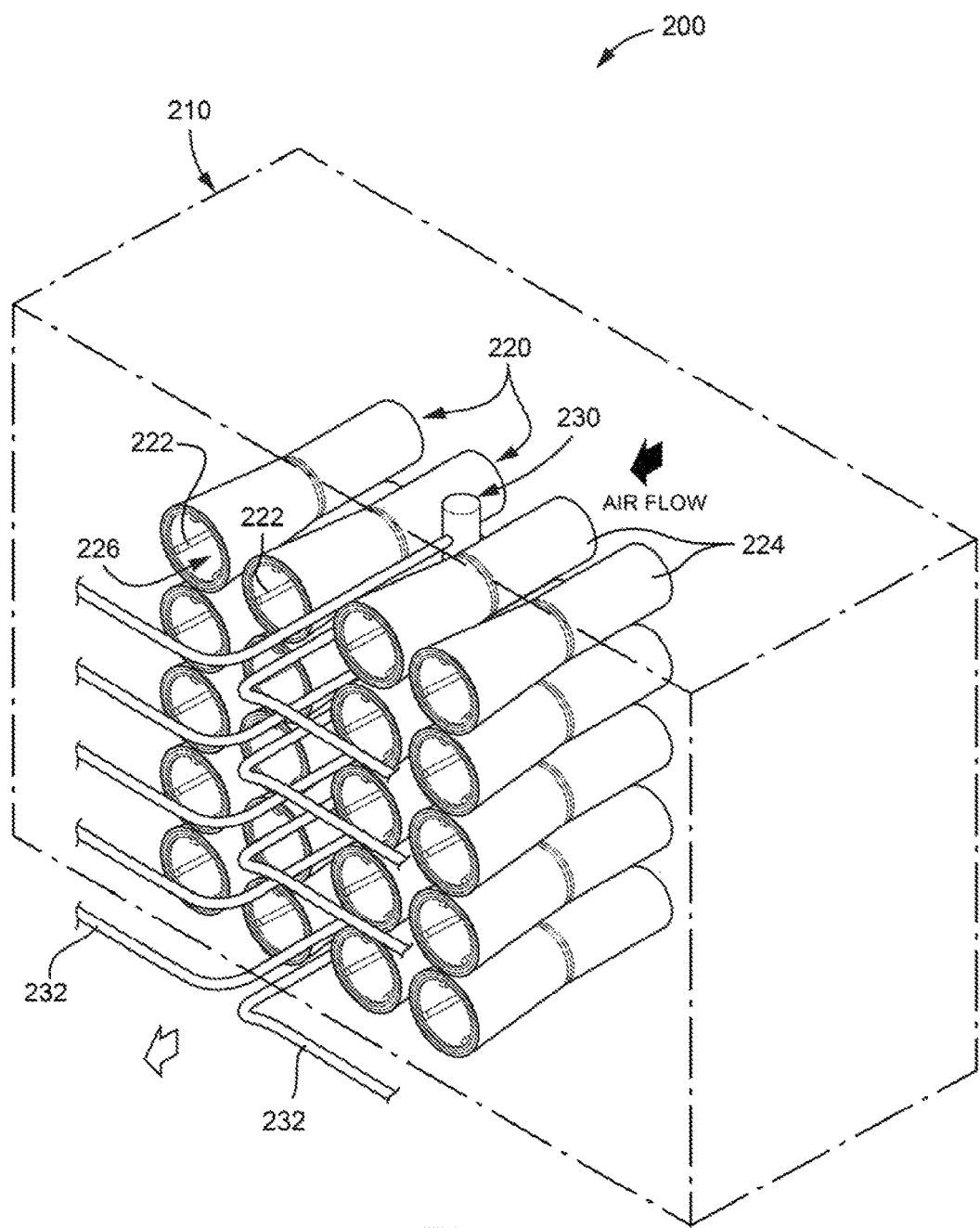
FIG. 2 is a perspective view of a filter house system according to an example of the disclosed technology.

The air which flows into the compressor may be first passed through a filter house system to clean the air by removing entrained particles. Turning to FIG. 2, a filter house system 200 is shown. The filter house system 200 includes a filter house enclosure 210 and a plurality of filter assemblies 220 arranged in the filter house enclosure. The filter assemblies 220 may be stacked in vertical columns, as shown in FIG. 2. Those skilled in the art will recognize that other suitable arrangements for arranging the filter assemblies 220 within the filter house enclosure 210 may be used.

Still referring to FIG. 2, each filter assembly 220 includes a frame 222 and a filter element 224 arranged to cover the frame. The filter element may be constructed of a flexible porous material, as those skilled in the art will understand. The frame 222 may be constructed from a rigid material (e.g., metal, plastic, etc.) and arranged to provide support to the filter element. The filter element may be arranged to form a shape which encloses a hollow interior, e.g., an oval shape, cylindrical shape, conical shape, or any combination thereof (e.g., combination cylindrical/conical shape forming the filter pair shown in FIG. 2). Those skilled in the art will recognize that more than two shapes may be used together to form a filter element. Further, those skilled in the art will recognize that other shapes, such as square cross-section or rectangular cross-section may be used.

The hollow interior of the filter element 224 forms an air passageway 226, as can be seen in FIG. 2. Air contained within the filter house enclosure 210 flows through the porous structure of the filter element 224 in a first direction to remove particles entrained in the air. The cleaned air then enters the hollow interior of the filter element and flows along the air passageway 226 toward a downstream end of the filter element 224.

Figure 3:
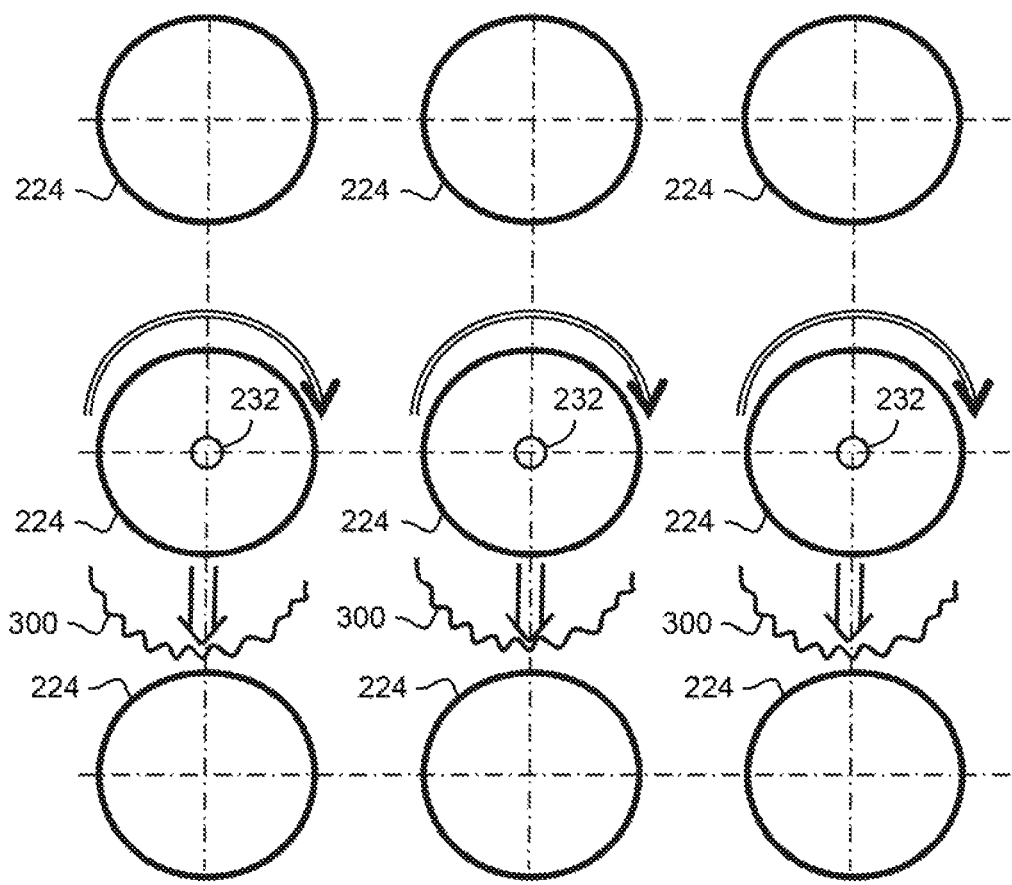
FIG. 3 is a schematic representation of a plurality of filter assemblies depicting a cleaning process according to an example of the disclosed technology.

As particles (or dust) are removed from the air, the particles accumulate on an outer surface of the filter element 224. The filter element may be rotated to allow gravity to pull portions of the dust 300 off of the filter without the dust falling onto the surface of filters positioned above the rotated filter, as illustrated in FIG. 3. The dust from the rotated filter may fall onto a filter positioned below the rotated filter. This process may be repeated with the lower level filter until the dust is ultimately dropped to a bottom of the filter house system. This technique assists in efficiently moving the dust toward the bottom of the filter house system where it can be removed. The filter element may be rotated at any suitable angle (e.g., 180°, 360°, 270°, 90°, etc.). Preferably, the filter is rotated at least 90°, or alternatively, at least 180°.

Figure 4:
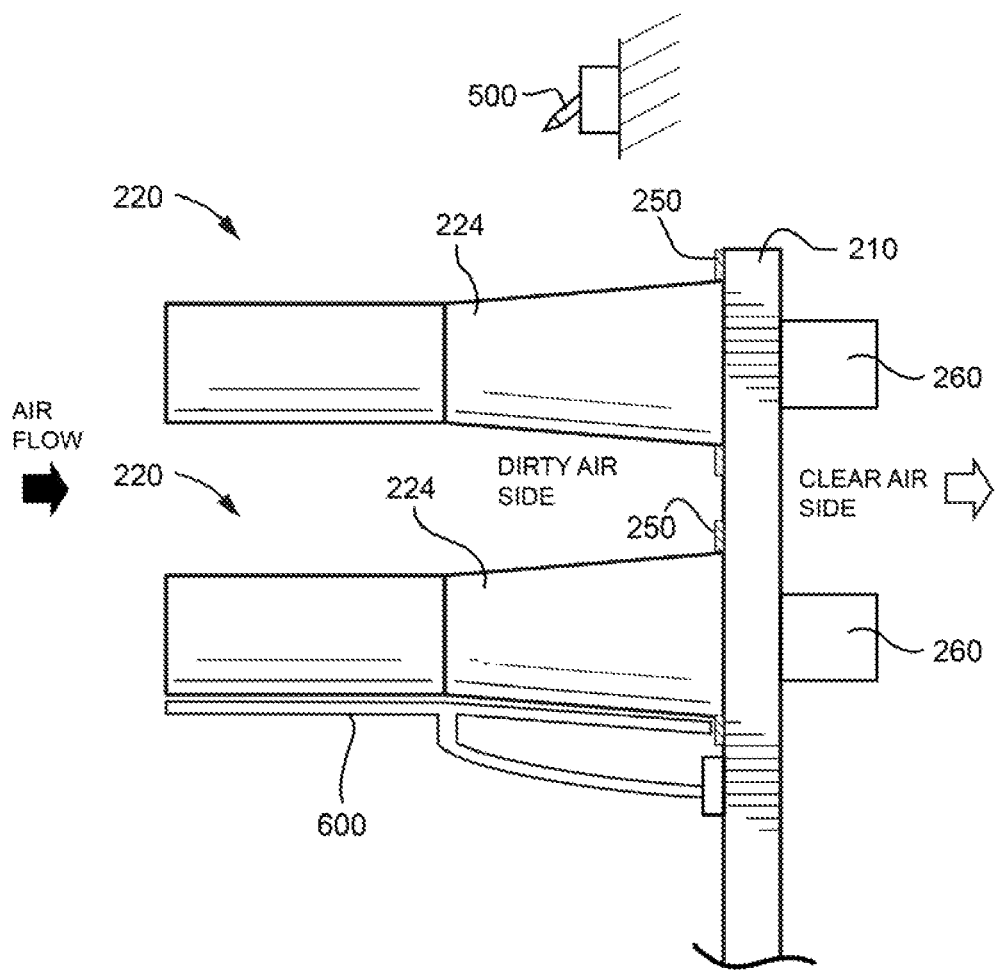
FIG. 4 is a partial side view of a group of filter assemblies of FIG. 2.

Referring to FIG. 4, a motion generator (e.g., motor 260, pneumatic-based device, hydraulic-based device, or magnet-based device, etc.) may be utilized to generate rotary motion of the filter element 224. For example, a shaft may have one end operatively connected to the motion generator and the other end operatively connected to the frame 222 or filter element 224 of the filter assembly 220.

A dynamic seal 250 may be provided between the filter element 224 and the filter house enclosure 210, as shown in FIG. 4. The filter element 224 may rotate relative to the filter house enclosure such that the dynamic seal 250 seals the air passageway 226 from the ambient area within the filter house enclosure. The wall of the filter house enclosure 210 which abuts the filter elements may comprise a tube sheet (FIG. 4).

Still referring to FIG. 4, a wiper blade 600 may be utilized in combination with rotation of the filter element 224 to aid in removing dust from the filter element. The wiper blade 600 may have an edge positioned along an outer surface of the filter element 224 so that the wiper blade contacts and knocks dust off of the filter as the filter rotates. Alternatively, the wiper blade 600 may be arranged to rotate around a stationary filter.

Additionally, a blow nozzle 500 (or plurality of blow nozzles) may be used alone or in combination with rotation of the filter element 224 to remove dust from the filter element, as shown in FIG. 4. The blow nozzle 500 may blow compressed air over the outer surface of the filter element to knock dust off of the filter. In an example in which the filter is stationary, the blow nozzles may be arranged to rotate around the filter element. It is noted that the blow nozzle 500 may be used without the wiper blade 600, and vice versa. Also, the blow nozzle 500 may be used with the wiper blade 600.

Figure 5:
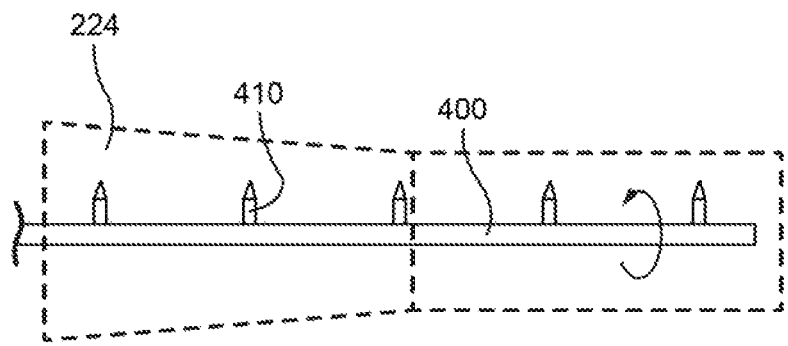
FIG. 5 is a side view of a rotating pressure pipe for cleaning a filter element according to an example of the disclosed technology.
Figure 6:
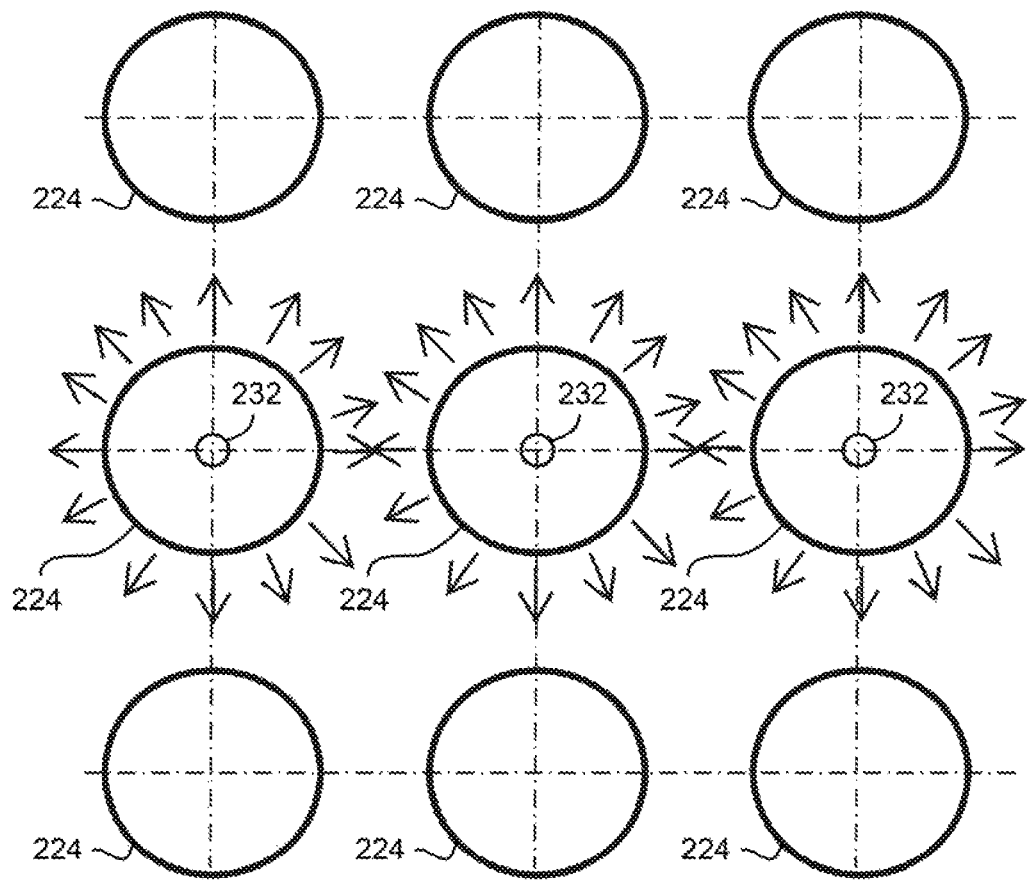
FIG. 6 is a schematic representation of a plurality of filter assemblies depicting a single row filter pulse according to a known process.

Referring to FIG. 5, in another example, a pressure pipe 400 may extend into the hollow interior of the filter element 224. The pressure pipe 400 may have a plurality of nozzles 410 positioned thereon at spaced intervals. The pressure pipe may be configured to rotate about a longitudinal axis of the filter element as compressed air is released from the nozzles 410 to dislodge dust from the filter (e.g., a stationary filter).

Figure 7:
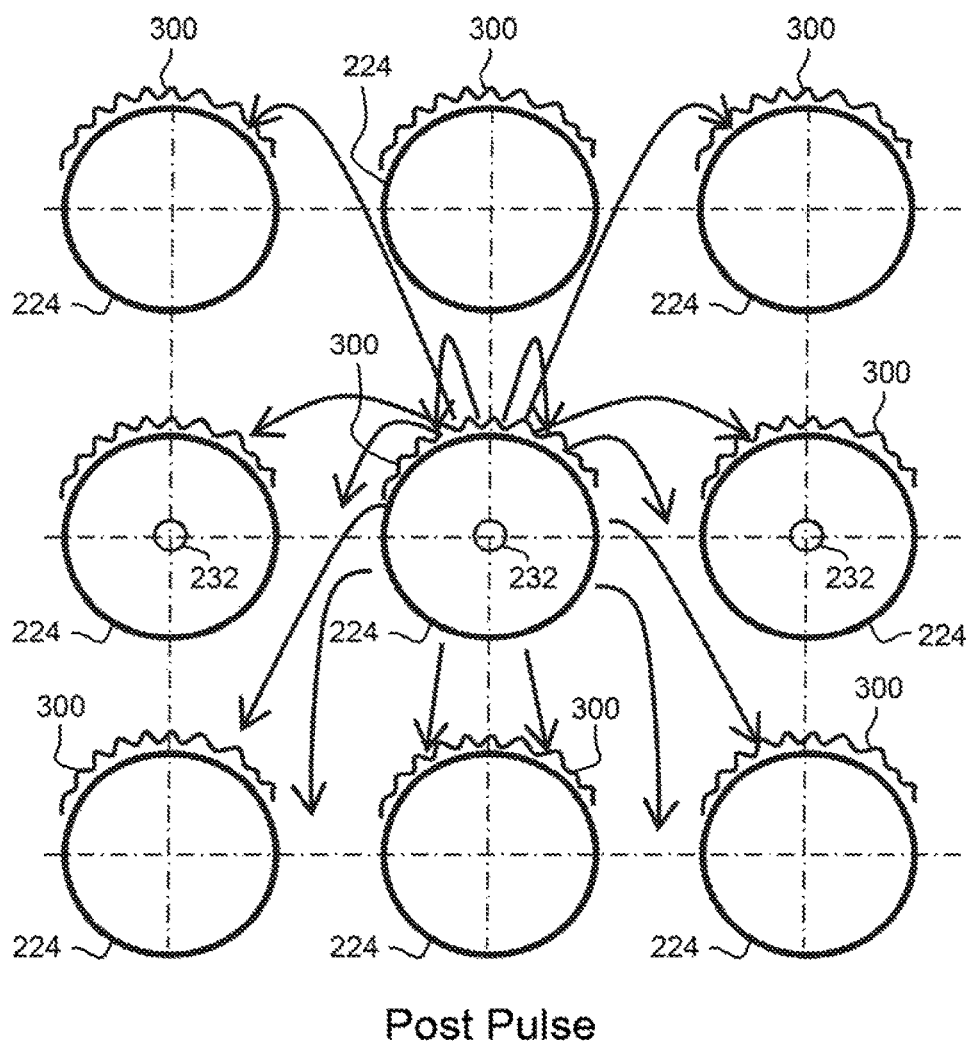
FIG. 7 is a schematic representation of a plurality of filter assemblies depicting a post pulse arrangement according to a known process.

It is noted that any of the techniques described above may be used with a pulse process to enhance dust removal. Turning back to FIG. 2, a header 230 may be provided to supply pressurized gas to pulse system piping 232. The piping 232 may extend into the air passageway 226 of the filter element 224 and nozzles may be provided to release the compressed air. During a pulse operation, gas is provided in a direction opposite to and at a higher pressure than the filtered air being conveyed along the air passageway. This causes air to pass through the filter element 224 in a second direction travelling from the air passageway 226 to the ambient area of the filter house enclosure 210. As shown in FIG. 7, dust 300 may be dislodged from the filters.

In an example, filters may be pulsed before they are rotated. Alternatively, the filters may be rotated and then pulsed. Further, the pulse system may be used with any of the other techniques described herein, e.g., the blow nozzles 500 and/or blade 600.

It is further noted that computerized control circuits may be provided to control an operation of the filter house system, including at least one microprocessor connected to execute computerized program code structures stored in a memory (e.g., possibly in conjunction with a suitable over-arching operating system as those skilled in the art will appreciate). For example, the microprocessor may execute instructions which cause the motion generator to rotate the filter.

While the invention has been described in connection with what is presently considered to be the most practical and preferred examples, it is to be understood that the invention is not to be limited to the disclosed examples, but on the contrary, is intended to cover various modifications and equivalent arrangements included within the spirit and scope of the appended claims.

What is claimed is:

1. A gas turbine system comprising:
   a compressor;
   a combustor connected to the compressor;
   a turbine connected to the combustor; and
   a filter house system connected as an input to the compressor, wherein the filter house system comprises a filter assembly, the filter assembly comprising,
      a filter element having a porous structure configured to pass air therethrough, the filter element being arranged so as to define a hollow interior forming an air passageway, the filter element being configured to remove entrained particles from air which passes through the filter element in a first direction toward the air passageway;
      a rotary motion generator arranged to rotate the filter element about a longitudinal axis extending in an airflow direction of the air passageway to cause particles accumulated on the filter element to fall downwardly away from the filter element due to gravity, wherein the rotary motion generator is one of a motor, a pneumatic-based device, a hydraulic-based device, or a magnet-based device;
      piping extending into the air passageway and configured to convey air arranged to pass through the filter element in a second direction opposite the first direction to cause particles accumulated on the filter element to be removed from the filter element; and
      a plurality of nozzles extending from the piping at spaced-apart locations in the first direction, wherein the piping is configured to rotate within the air passageway such that the nozzles are rotated about the longitudinal axis.

2. The gas turbine system of claim 1, further comprising at least one microprocessor configured to cause the filter element to rotate after air is passed through the filter element in the second direction.

3. The gas turbine system of claim 1, wherein the motion generator is configured to rotate the filter element at least 90 degrees.

4. The gas turbine system of claim 1, further comprising a dynamic seal between the filter element and a filter house enclosure, wherein the filter element is arranged to rotate relative to the filter house enclosure, and wherein the dynamic seal seals the air passageway from the ambient area of the filter house enclosure.

5. The gas turbine system of claim 1, wherein the filter element has a cylindrical shape and/or conical shape and/or oval shape.

6. The gas turbine system of claim 1, wherein a wiper blade is arranged to remove accumulated particles from the filter element.

7. The gas turbine system of claim 1, further comprising a blow nozzle positioned adjacent the filter element and configured to blow air across a surface of the filter element to cause particles accumulated thereon to be dislodged.

8. The gas turbine system of claim 1, wherein the motion generator is a motor.

9. A gas turbine system comprising:
a compressor;
a combustor connected to the compressor;
a turbine connected to the combustor; and
a filter house system connected as an input to the compressor, wherein the filter house system comprises a filter assembly, the filter assembly comprising;
a filter element having a porous structure configured to pass air therethrough, the filter element being arranged so as to define a hollow interior forming an air passageway, the filter element being configured to remove entrained particles from air which passes through the filter element in a first direction toward the air passageway;
a motion generator arranged to rotate the filter element about a longitudinal axis extending in an airflow direction of the air passageway to cause particles accumulated on the filter element to fall downwardly away from the filter element due to gravity, wherein the motion generator is one of a motor, a pneumatic-based device, a hydraulic-based device, or a magnet-based device;
piping extending into the air passageway and configured to convey air arranged to pass through the filter element in a second direction opposite the first direction to cause particles accumulated on the filter element to be removed from the filter element; and
a plurality of nozzles extending from the piping at spaced-apart locations in the first direction, wherein the piping is configured to rotate within the air passageway such that the nozzles are rotated about the longitudinal axis.

10. The gas turbine system of claim 9, further comprising at least one microprocessor configured to cause the filter element to rotate after air is passed through the filter element in the second direction.

11. The gas turbine system of claim 9, wherein the motion generator is configured to rotate the filter element at least 90.

12. The gas turbine system of claim 11, further comprising a dynamic seal between the filter element and a filter house enclosure, wherein the filter element is arranged to rotate relative to the filter house enclosure, and wherein the dynamic seal seals the air passageway from the ambient area of the filter house enclosure.

13. The gas turbine system of claim 12, wherein the filter element has a cylindrical shape and/or conical shape and/or oval shape.

14. The gas turbine system of claim 13, wherein a wiper blade is arranged to remove accumulated particles from the filter element.

15. The gas turbine system of claim 14, further comprising a blow nozzle positioned adjacent the filter element and configured to blow air across a surface of the filter element to cause particles accumulated thereon to be dislodged.

16. The gas turbine system of claim 9, wherein the motion generator is the motor.

* * * * *